United States Patent
Siksa

(10) Patent No.: US 7,603,314 B2
(45) Date of Patent: Oct. 13, 2009

(54) AUTOMATIC BILLING EVENT SUBMISSION RECONCILIATION FOR ON DEMAND SYSTEMS

(75) Inventor: Mary Ellen Siksa, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/809,662

(22) Filed: Mar. 25, 2004

(65) Prior Publication Data

US 2005/0216396 A1    Sep. 29, 2005

(51) Int. Cl.
    *G06Q 40/00* (2006.01)
(52) U.S. Cl. ...................................................... 705/40
(58) Field of Classification Search .................... 705/40
    See application file for complete search history.

(56) References Cited

U.S. PATENT DOCUMENTS

| | | | |
|---|---|---|---|
| 5,943,656 A * | 8/1999 | Crooks et al. .................. | 705/30 |
| 6,006,204 A | 12/1999 | Malcolm ...................... | 705/30 |
| 6,102,287 A | 8/2000 | Matyas et al. ................ | 235/380 |
| 6,418,467 B1 * | 7/2002 | Schweitzer et al. .......... | 709/223 |
| 6,546,093 B1 | 4/2003 | Klose et al. .................. | 379/133 |
| 6,771,758 B1 * | 8/2004 | Sandel et al. .......... | 379/201.12 |
| 7,240,028 B1 * | 7/2007 | Rugge .......................... | 705/30 |
| 7,369,968 B2 * | 5/2008 | Johnson et al. .............. | 702/188 |
| 2001/0012346 A1 | 8/2001 | Terry ...................... | 379/112.01 |
| 2002/0026416 A1 * | 2/2002 | Provinse ....................... | 705/39 |
| 2002/0120624 A1 * | 8/2002 | Givoly et al. .................. | 707/7 |
| 2003/0036918 A1 * | 2/2003 | Pintsov .......................... | 705/1 |
| 2003/0120594 A1 | 6/2003 | Shaginaw et al. ............. | 705/40 |
| 2003/0194070 A1 * | 10/2003 | Shibasaki et al. ...... | 379/114.01 |
| 2004/0054685 A1 * | 3/2004 | Rahn et al. ................... | 707/102 |
| 2004/0186760 A1 * | 9/2004 | Metzger ........................ | 705/7 |
| 2005/0021527 A1 * | 1/2005 | Zhang et al. ................ | 707/100 |
| 2005/0044015 A1 * | 2/2005 | Bracken et al. ............... | 705/30 |
| 2005/0177470 A1 * | 8/2005 | Tandon et al. ................. | 705/30 |
| 2005/0187852 A1 * | 8/2005 | Hwang ......................... | 705/36 |
| 2007/0010914 A1 * | 1/2007 | Johnson et al. ............. | 700/276 |

OTHER PUBLICATIONS

Roark et al.: Billing and settlement: meeting the challenge of a wholesale electricity market, Jan./Feb. 2004, Elserver Inc., pp. 61-69.*

(Continued)

*Primary Examiner*—Hani Kazimi
*Assistant Examiner*—Bijendra K Shrestha
(74) *Attorney, Agent, or Firm*—John R. Pivnichny; Law Office of Jim Boice

(57) ABSTRACT

Reconciliation subsystem for use with a system for recording, analyzing, verifying, and reporting of product used, sold, or transferred from multiple locations at various prices or costs to different customers in a business or in commerce, and generating consolidated billing notices. The reconciliation starts by logging the session start time and retrieving the last session start time, and retrieving the logs from the feeder and the interim control points. If there is an error at this point, the appropriate notification is issued, the session status is logged, and the reconciliation process ended. If there is no error, the records are compared, checked for unreconciled records, and the report prepared and published. Session status is logged, and the reconciliation process is ended.

18 Claims, 6 Drawing Sheets

OTHER PUBLICATIONS

Figure 1:
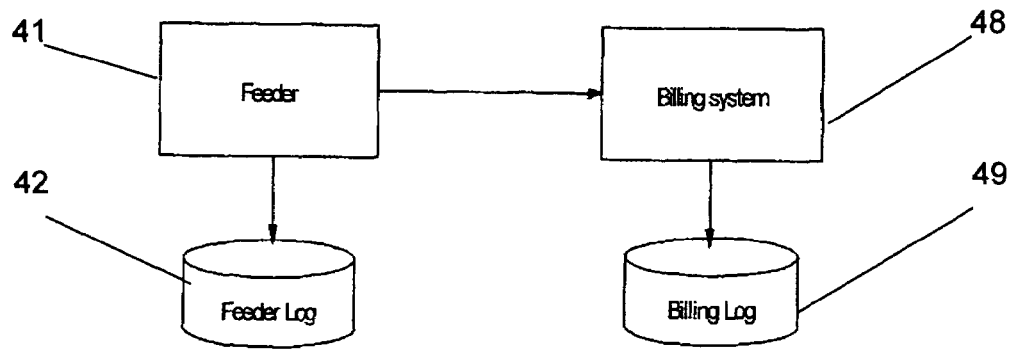

Brandl et al.: Cost accounting for shared IT infrastructures, Writschaftsinformatics, 49 (2007) 2, pp. 83-94.*

Merwe et al.: Resource consumption accounting, Strategic Finance, Apr. 2002, 83, 10; ABI/INFORM Global, pp. 30-36.*

Method to Automatically tie accounting monitors to desktop or individual windows on a computer GUI, Research Disclosures, 455128 (p. 490) (Mar. 2002).

Automatic Process for IBM Labor Claiming, Research Disclosures, 445136 (p. 844) (May 2001).

* cited by examiner

AUTOMATIC BILLING EVENT SUBMISSION RECONCILIATION FOR ON DEMAND SYSTEMS

FIELD OF THE INVENTION

The invention described herein relates to a method, system, and program product for recording, analyzing, verifying, and reporting of product used, sold, or transferred from multiple locations at various prices or costs to different customers in a business or in commerce, and generating consolidated billing notices, for example notices of payment due, or funds transferred, in response to the transaction. Product can include, strictly by way of example telecommunications bandwidth, electricity, fuels, chemicals, and general merchandise.

BACKGROUND

Today service providers are beginning to embrace a pay-as-you-go billing model. This is a model where the user is billed for the amount of service used or resource consumed rather then a fixed, flat monthly fee. However, in the pay-as-you-go billing model, the service provider must be able to meter, monitor, or measure the customer's usage of a resource or service. Additionally, where necessary, the resource or service provider must be able to identify the customer's usage of the resource or commodity to both the class (or quality) of the resource or commodity, and to the quantity of the resource or commodity.

Consider, for example, cellular telephone service. In a typical cellular telephone service plan the customer is billed by the number of on air minutes. The number of on air minutes is then sent to a billing system where it is applied against the customer's plan, for example, $29.95 per month for the first 300 on air minutes and thereafter $0.25 per minute for each minute over 300 minutes.

Consider a more complex system, residential electrical service may be delivered through "multiple meters." One meter is for "base line" service (see FIG. 7 feeder log detail 411*a*) at, for example $0.11 per kilowatt hour for the first 600 kilowatt hours, and an increasing amount for each additional 200 kilowatt hours. Another meter is for "interruptible" power (see FIG. 7 feeder log detail 411*b*) at $0.09 per kilowatt hours. A third meter may be for "time shifted" power (see FIG. 7 feeder log detail 411*c*) at a high rate during daytime hours and a reduced rate for evening and night time use. Finally, there may be a "backwards" meter for "selling back" co-generated power (see FIG. 7 feeder log detail 411*d*). Consumption of the different classes of service is sent to a billing system where it is applied against the customer's plan and billed to the customer.

In a pay-as-you-go billing model, numerous events are measured in a distributed infrastructure, such as a cellular telephone or electric power service area, and are sent to a central billing system to charge the customer for the services or resources. One requirement of a billing system in a distributed pay-as-you-go billing system is accountability and tracking. There must be a way to ensure that billable events generated by feeders at the point of use or consumption are received at the billing system. This requires reconciliation of feeder's feeds to the billing system with the feeds actually received by the billing system.

FIG. 1, captioned as "PRIOR ART" illustrates the flow of billing events from a feeder 41 to a billing system 48. The feeder logs the records sent to the billing system in a feeder log 42, and the billing system logs the records received by the billing system in a billing log 49. To be noted is that the reports generated by the feeder 41 and logged in the feeder log 42 may not match the events received at the billing system 48 and logged in the billing log 49.

Currently the reconciliation between feeder records and billing records is performed manually, that is, by comparing reports generated at the many feeders with reports actually received and entered at the billing system. As pay-as-you-go billing systems become prevalent for service and resource providers, the sheer volumes of records flowing from feeders to the billing systems will increase, and manual systems, even "management by exception" manual systems, will no longer be acceptable. This means that there is a clear need for a reliable, automated way to reconcile feeder records to billing system records.

SUMMARY OF THE INVENTION

The method, system, and program product described herein provides a reliable, automated way to reconcile feeder records to billing system records. Reconciliation may be accomplished in real time or in a batch process. The method, system, and program product further provide notification when the feed records and billing records are out of balance. A further aspect of the method, system, and program product is the capability to scan the various log files on a random or scheduled or as-needed basis, examining the log files for missing, duplicate, and corrupted records, and generate balance reports and out of balance notifications, as necessary.

Aspects of the method, system, and program product include a mechanism to uniquely identify feeders, target billing systems, and even individual records. A further aspect of the method, system, and program product is the capability of handling both batch and real time feeds independent of the data format or communications protocol. A still further aspect of the method, system, and program product described herein is the handling of multiple feeders, multiple independent hops, and multiple target billing systems. A still further aspect of the method, system, and program product described herein is reporting capability to show in-balance and out-of-balance conditions.

According to the method, system, and program product described herein, an administrator is notified of any error condition, including information for problem determination. The information may include a list of records sent by the various feeders and not received by the billing system, as well as information received by the billing system but neither identified to or associated to a feeder. This allows determination as to where the records were lost or duplicated.

THE FIGURES

Various aspects of the method, system, and program product described herein are illustrated in the FIGURES attached hereto.

FIG. 1, denominated "Prior Art" illustrates a system of the prior art with a single feeder and single billing system, each with a log.

Figure 2:
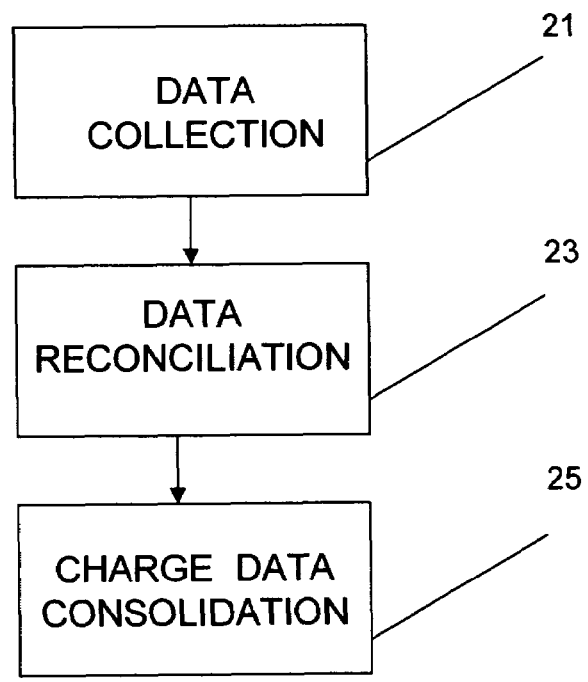

FIG. 2 is a simplified flow chart showing data collection, data reconciliation, and charge data consolidation (that is, billing).

Figure 3:
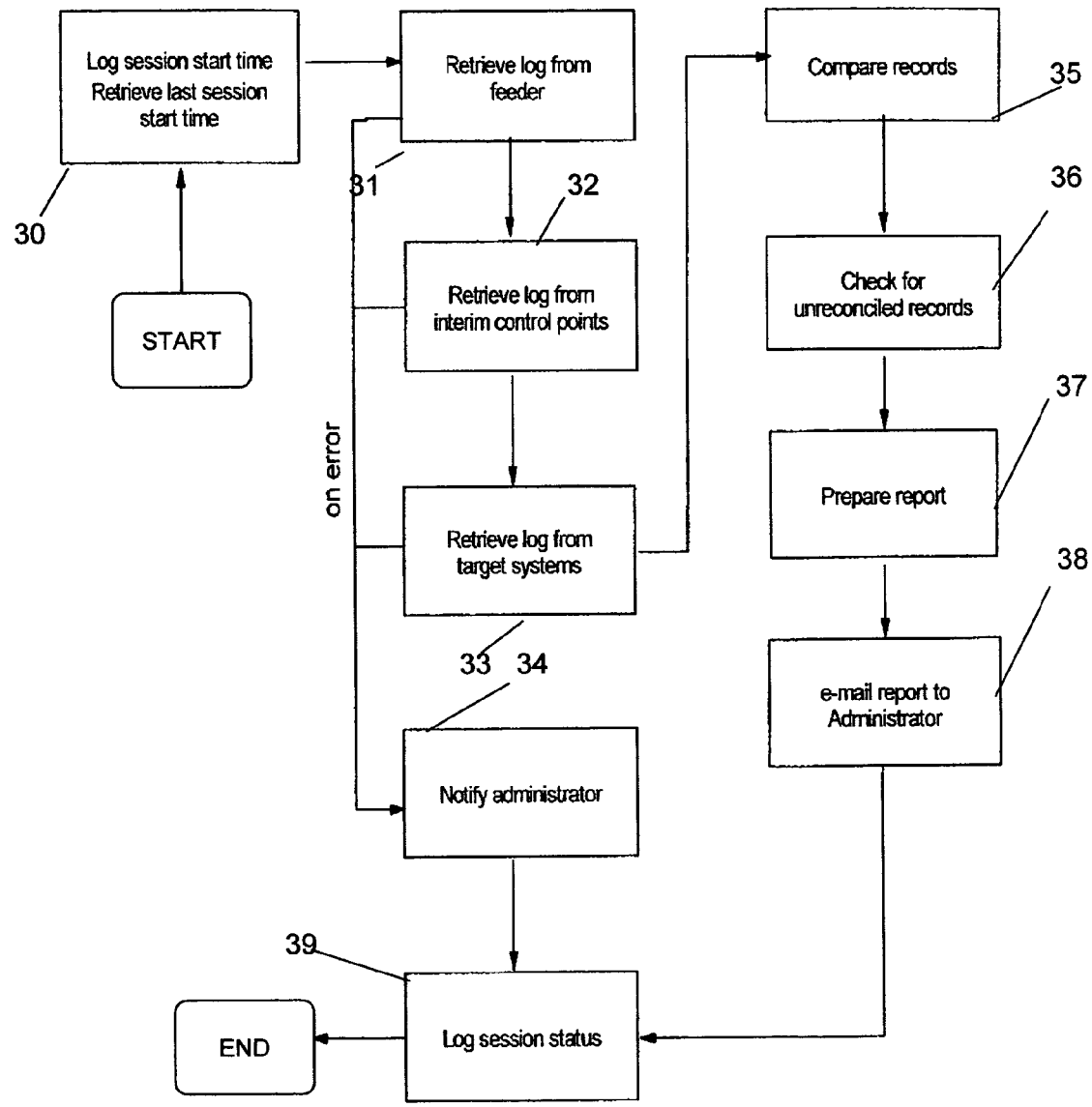

FIG. 3 is a flow chart of the reconciliation process. The reconciliation starts by logging the session start time and retrieving the last session start time, and retrieving the logs from the feeder and the interim control points. If there is an error at this point, the appropriate notification is issued, the session status is logged, and the reconciliation process ended. If there is no error, the records are compared, checked for unreconciled records, and the report prepared and published. Session status is logged, and the reconciliation process is ended.

Figure 4:
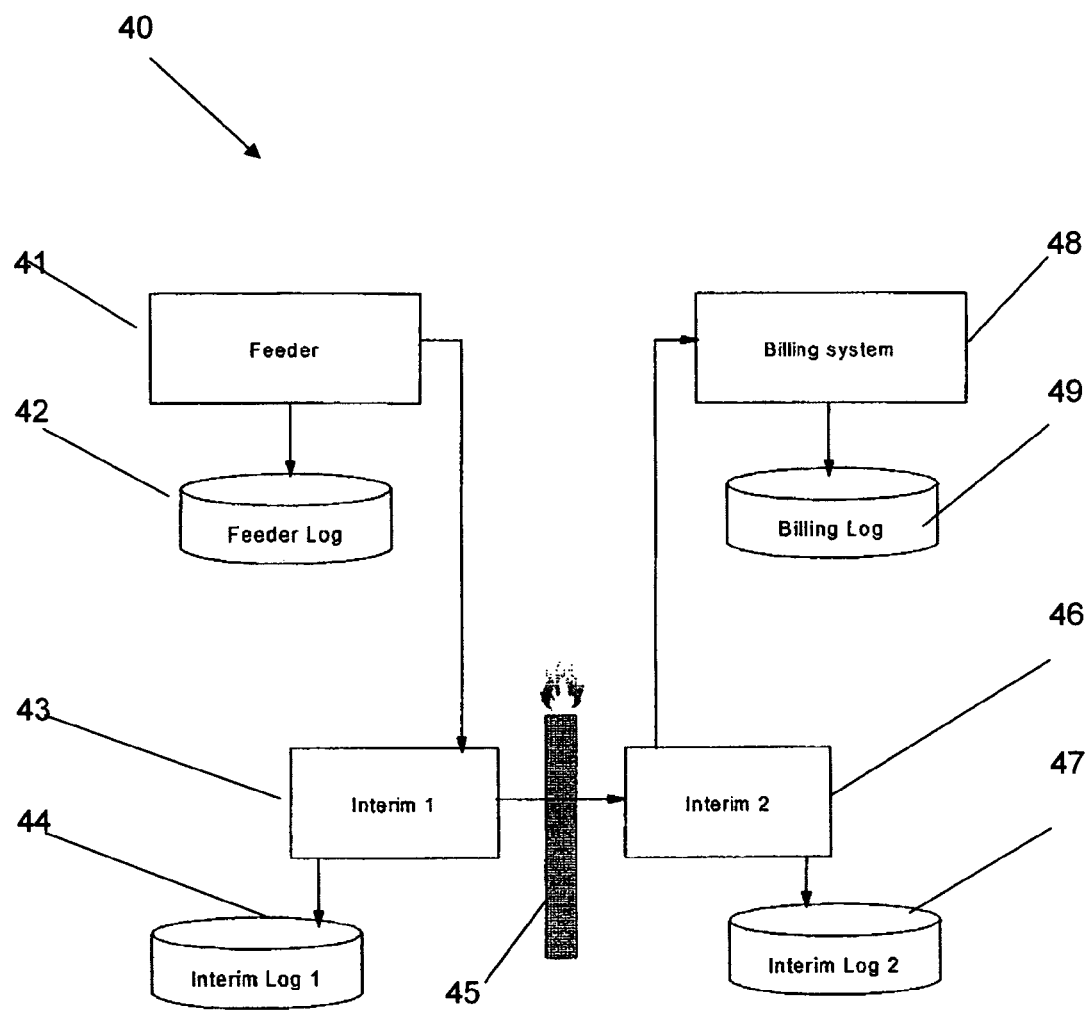

FIG. 4 illustrates a simplified system with a single feeder to a single billing system. The feeder is associated to a feeder log, and to an interim node with an associated interim log. The feeder side of the system is separated from the billing side by a fire wall. The billing side includes an interim node with an interim node log, and the billing system with an associated billing log.

Figure 5:
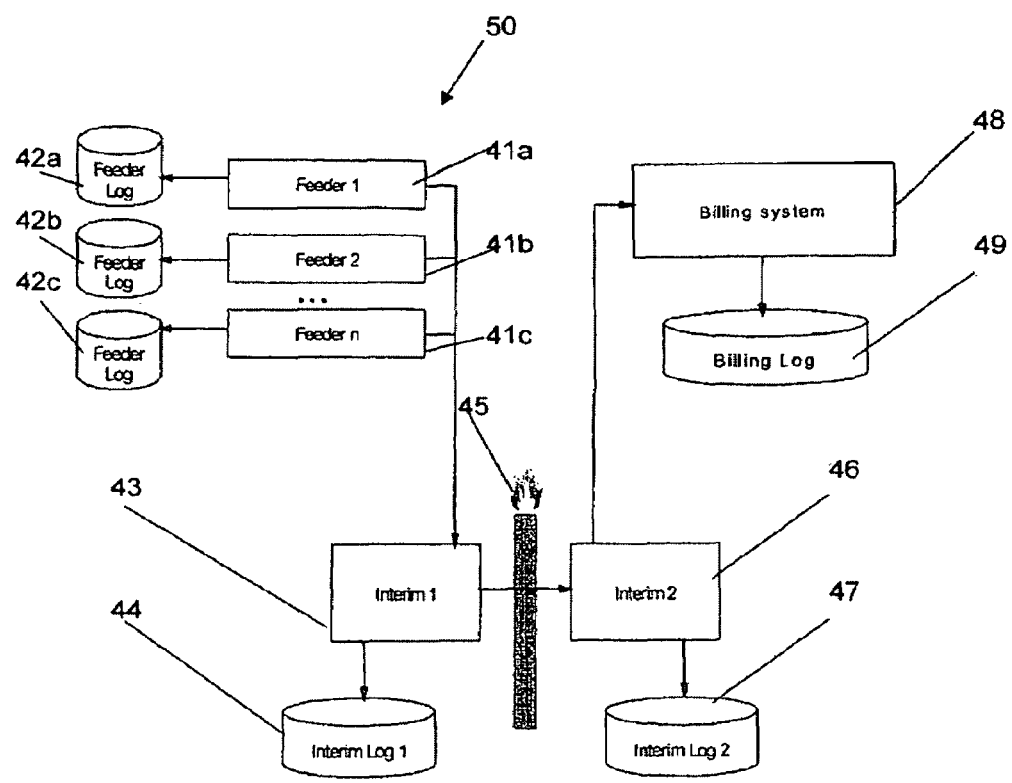

FIG. 5 illustrates a complex system with multiple feeders to a single billing system. The feeders are associated to feeder logs, and to an interim node with an associated interim log. The feeder side of the system is separated from the billing side by a fire wall. The billing side includes an interim node with an interim node log, and the billing system with an associated billing log.

Figure 6:
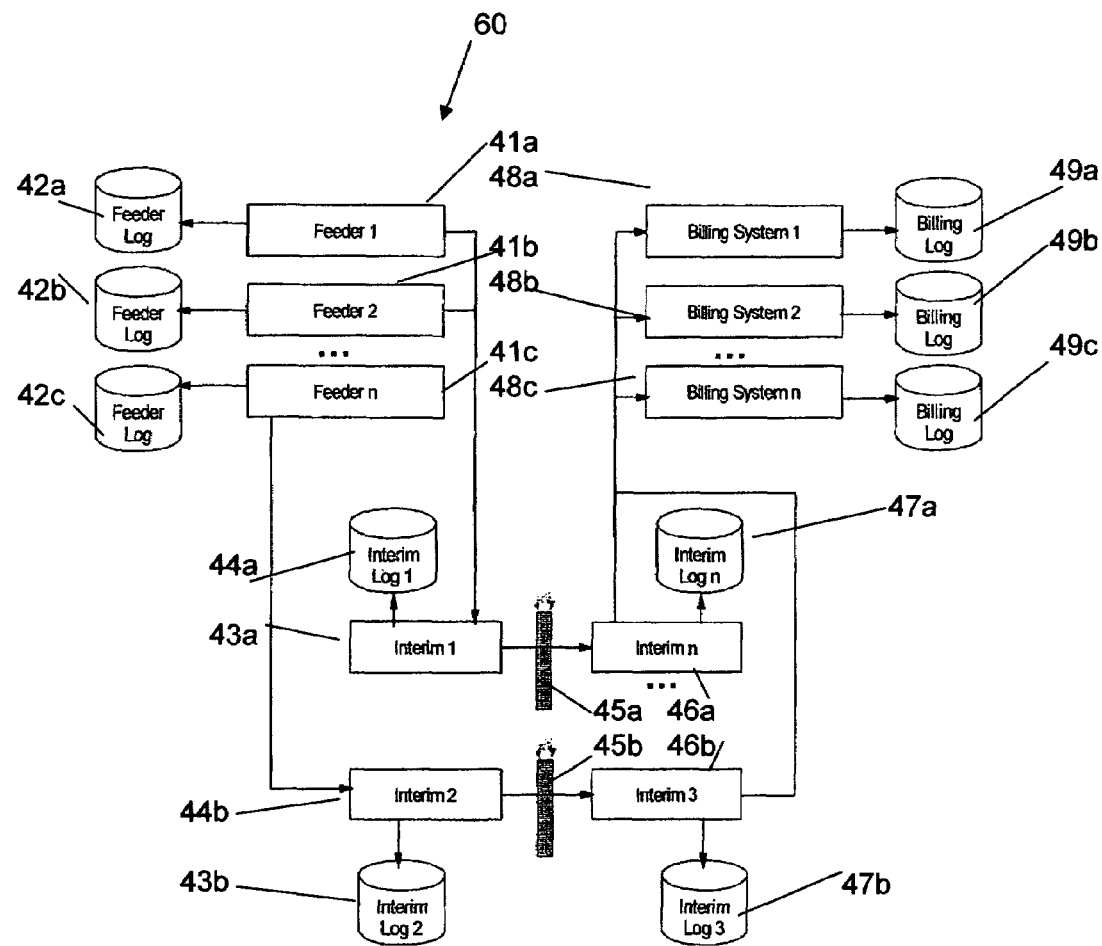

FIG. 6 illustrates a still more complex system with multiple feeders to multiple billing systems. The feeders are associated to feeder logs, and to an interim node with an associated interim log. The feeder side of the system is separated from the billing side by a fire wall. The billing side includes an interim node with an interim node log, and the billing systems with associated billing logs.

Figure 7:
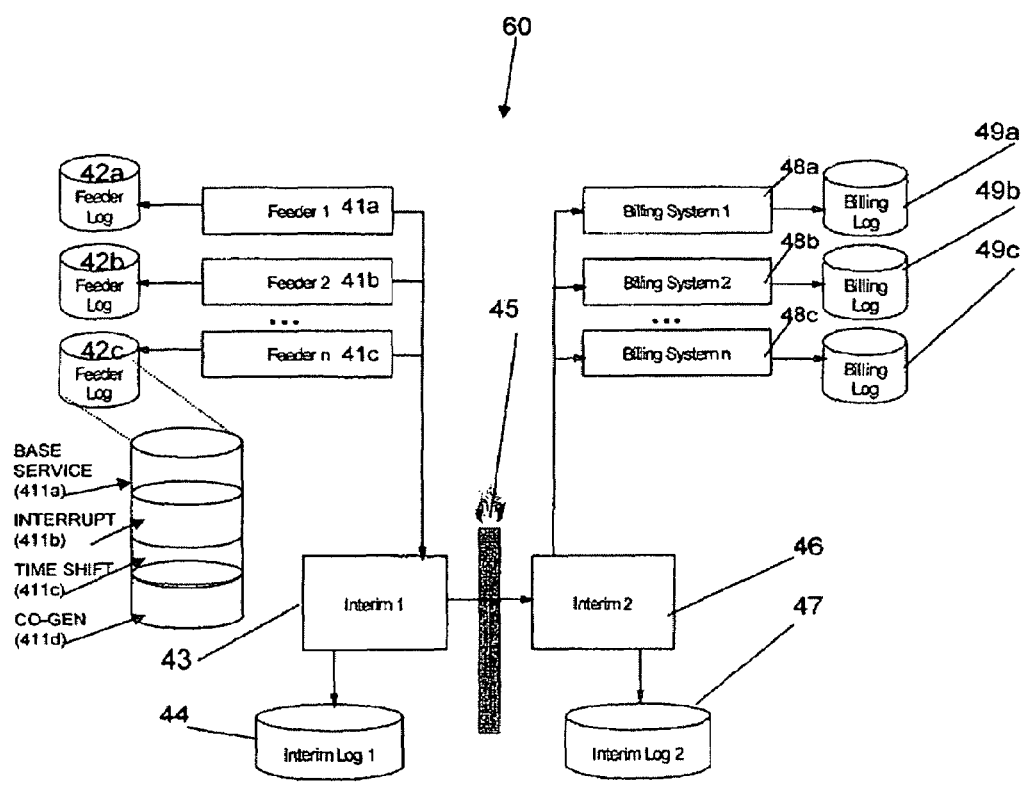

FIG. 7 illustrates a data collection—data reconciliation—billing system applied to an electric power distribution system. The data collection—data reconciliation—billing system has multiple feeders, typically "electric meters" to multiple billing systems. The feeders collect data from the various associated "electric meters" and are associated to feeder logs, and to an interim node with an associated interim log. The feeder side of the system is separated from the billing side by a fire wall. The billing side includes an interim node with an interim node log, and the billing systems with associated billing logs. In a purely deregulated environment the different billing systems could be different generating companies, such as a coal fired company, a gas fired company, a hydroelectric company, and a wind turbine company. Alternatively, the different billing systems could represent different markets or regulatory regimes.

DETAILED DESCRIPTION

The method, system, and program product described herein provides a reliable, automated way to reconcile feeder records to billing system records. Reconciliation may be accomplished in real time or in a batch process. The method, system, and program product further provide notification when the feed records and billing records are out of balance. A further aspect of the method, system, and program product is the capability to scan the various log files on a random or scheduled or as-needed basis, examining the log files for missing, duplicate, and corrupted records, and generate balance reports and out of balance notifications, as necessary.

Aspects of the method, system, and program product include a mechanism to uniquely identify feeders, target billing systems, and even individual records. A further aspect of the method, system, and program product is the capability of handling both batch and real time feeds independent of the data format or communications protocol. A still further aspect of the method, system, and program product described herein is the handling of multiple feeders, multiple independent hops, and multiple target billing systems. A still further aspect of the method, system, and program product described herein is reporting capability to show in-balance and out-of-balance conditions.

According to the method, system, and program product described herein, an administrator is notified of any error condition, including information for problem determination. The information may include a list of records sent by the various feeders and not received by the billing system, as well as information received by the billing system but neither identified to or associated to a feeder. This allows determination as to where the records were lost or duplicated.

FIG. 2 is a simplified flow chart showing data collection 21, data reconciliation 23, and charge data consolidation (that is, billing) 25.

Record reconciliation depends on effective and accurate logging. In this regard, each record sent by the feeder must contain certain tracking information, and each subsystem must log, that is, write a log entry, for each record processed. Each log entry must contain the necessary tracking information.

Record reconciliation in the reconciliation subsystem uses the various logs to reconcile the feeds and for problem determination and reporting. While the most efficient way to maintain these logs is through a database or a system of databases, the method, system, and program product is independent over whether the log is maintained in one or more databases, or in files, or by another mechanism.

The following information should be in each log entry:

1. A unique system identifier, that is, a system identifier that is unique within the scope of the infrastructure being reconciled.
2. A target system identifier, that is, a system identifier that is unique within the scope of the infrastructure being reconciled.
3. A unique record identifier, that is a record identifier that is unique within the scope of the system.
4. The time and date ("time stamp") for the record being logged.
5. The audit scope identifier, that is, the time and date of the next scheduled reconciliation as well as other audit data.
6. A numeric field indicating the quantity of the resource consumed by the customer. This field may also contain various product or resource identifiers.
7. A reconciliation time and date to be filled in by the reconciliation system.

With respect to the unique system identifier, each subsystem in the system must be uniquely identified. For example, each hardware subsystem in the system could have a unique identifier, with a unique "application instance" identifier for each feeder on the hardware system. These are referred to herein as a SystemID and AppInstanceID, respectively.

Identification of the target billing system is essential. This is especially true where the billing system has more than one component or more than one target billing system. This is especially the case with electric power where one transmission system or one local distribution system serves a plurality of generation companies, for example, with different billing structures. This is also the case for the products and byproducts of a modem, integrated petroleum refinery, where a range of products from heavy hydrocarbons (asphalt, tar) through liquid products (as gasoline, diesel fuel, kerosene) to gaseous hydrocarbons (methane, ethane) are either transferred internally (with an associated inter-divisional transfer cost), or sold, for specific industrial or commercial segments.

The target billing systems can be identified in several ways. For example, the target billing system name could be explicitly specified by the feed in the record created by the feeder to be sent to the various target billing systems. Alternatively, the record could contain some verb that indicates to a processing system which billing target system to use.

According to a still further alternative, there may exist a one to one mapping of specific products to specific target billing systems.

Each record requires a unique identifier. This unique identifier is referred to herein as a Request Reference, "RequestRef". The RequestRef must be unique within the set of all records created by a specific feeder in a specific and configurable period of time. The time period may be arbitrarily or algorithmically set, and is related to how long the owner of the system wishes to retain records for audit, reconciliation, or problem determination purposes. Once a set of records are discarded the RequestRefs of those records may be reused, however, a feeder may not create a new record with a RequestRef that is currently stored in any log.

A further record identifier is the unique key of a record. Each record in the system has a unique key. In one embodiment the unique key may be obtained by concatenating the SystemID, AppInstance, and RefRequest. This unique key would identify a record to a feeder system, a particular feeder, a record from that particular feeder on the particular feeder system. The routines for processing one or both of the log databases and log file processing routines should be programmed to never allow any subsystem in the feeder—reconciliation—billing system to store a new record that has a unique key, including SystemID, AppInstance, and RefRequest that is already contained in any local log. Any attempt to assign the same unique key to another, new, record should generate an error. The error should either prompt the offending feeder to generate a new RequestRef, if the feeder is the source of the error, or return an error message to the feeder that generated the record.

A quantity field is part of a feeder record intended for a billing subsystem. The "quantity" is a numerical value that indicates how much of a resource a customer has consumed. In order to ensure that quantity fields are not altered along the path to the billing subsystem, the quantity values may be used as a "hash" value. If quantity is not used, the feeder may enter a random number to be used in the same manner.

A further field is a log time and date field. Each log entry must contain the time and date that the entry was made. This entry is used by the reconciliation subsystem to ensure that records are properly reconciled.

A further field in each feeder record is the audit scope field. The audit scope data is used to group records for reconciliation. The audit scope field is a character field that contains the year, month, and day, and optionally time, of the next scheduled reconciliation for that feeder. The character field may be YYYYMMDD (year, month, day) or even YYYYMMDDHHMMSS (year, month, day, hour, minute, second).

The audit scope field or audit scope ID date indicator changes as often as the feeder is scheduled for reconciliation. For example, if the feeder is scheduled for weekly reconciliation, then the feeder must change the Audit Scope ID weekly to match the next scheduled reconciliation.

A further requirement for reconciliation is individual feeder profiles for each subsystem. The profile data can be stored in databases or other files. The profile information must include:
1. Address and access information. This is both the feeder address on the network (including a virtual network), and such access information as system login, database information, and file names.
2. The feeder's local time zone.
3. Notification information for an out of balance condition, that is, e-mail, pager, or cell phone information.
4. Information on where to send reconciliation information.
5. The path information, that is, the system ID for each "hop" in the path that the data will take from the feeder system, through interim processing points, to the target billing system.

The automated reconciliation program will generally run for each feeder and will normally run on a scheduled time that has been set for each individual feeder or set of feeders. However, automated reconciliation may be performed as needed, that is, to ensure that an anomaly is corrected or a problem fixed, or to reconcile feeds outside the normal operating time. Any system scheduler, such as "cron" on UNIX can be used to schedule reconciliations.

FIG. 3 is a flow chart of the reconciliation process. The reconciliation starts by logging the session start time and retrieving the last session start time (Block 30), and retrieving the logs from the feeder (Block 31) and the interim control points (Block 32). If there is an error at this point, the appropriate notification is issued (Block 34), the session status is logged (Block 39), and the reconciliation process ended. If there is no error, the records are compared (Block 35), checked for unreconciled records (Block 36), and the report prepared (Block 37) and published (Block 38). Session status is logged (Block 39), and the reconciliation process is ended.

The automated reconciliation program, as shown in FIG. 3, is started by a system job scheduler to reconcile records within the audit scope for one or more feeders.

Reconciliation is started when the scheduler passes a feeder system ID to the automated reconciliation program.

The automated reconciliation reads the profile information for the identified feeders, and uses the current time and the feeder's time zone to calculate the current scope ID value to use.

The automated reconciliation subsystem retrieves reconciliation logs along the path used moving data from the selected feeder to the selected billing subsystem. Only records within the audit scope are retrieved for reconciliation.

At this point the automated reconciliation sub system verifies that the records sent from the feeder or feeders balance with the records received at the billing subsystem. This includes that the totals of the quantity fields are correct on both the feeder sub systems and the billing sub system, that is, that they match. If the records do not balance (that is, the numbers of records of the various identification fields do not match) or the quantity fields do not match, the automated reconciliation sub system issues an appropriate notification. This notification is issued in accordance with the information in the profile for the feeder.

To be noted is that the automated reconciliation sub system has all of the logs for all of the points in the system, that is, feeder sub systems, nodes, interim nodes, and billing sub systems. This enables the automated reconciliation subsystem to determine where a record was lost or altered.

The automated reconciliation sub system also checks for old, unreconciled records in the logs. These are records with audit scope dates older then the audit scope date currently being reconciled. If such old, unreconciled records exist, the automated reconciliation sub system issues a notification according to the feeder profile.

The automated reconciliation sub system also checks for the earliest log date on the set of records collected for the audit scope ID. The automated reconciliation sub system uses this date to check if there are any records with earlier log dates that are not marked with a reconcile date. If any such records are found, the automated reconciliation system issues a notification according to the information in the profile for this feeder.

This condition may arise if the feeder sub system sends records with a different audit scope ID than it should have. This may also arise when an audit scope was out of balance due to an extra record having been sent by the feeder sub system, so that the extra record does not have a reconcile date in the log. In this case the record may be detected by the check for unreconciled records in the next scheduled reconciled. An understanding of the set of events giving rise to the unreconciled or extra record is important for doing problem determination for an out of balance report.

If the audit scope is in balance, the automated reconciliation sub system marks the records that were reconciled in appropriate logs, for example, each log in the path. Alternatively, successfully reconciled records can be pruned.

After reconciliation, the automated reconciliation sub system sends a balance report in accordance with the profile data, and also logs its own session status and balance information, e.g., for problem determination purposes.

Reconciliation can be scheduled or run on an "as needed" basis. Typically, the schedules for reconciliation are set to complete on a cycle that is consistent with the actual billing system cycle, that is, typically, monthly. This helps out of balance conditions from interfering with the billing system and the invoicing cycle. For a real time system, a best effort can be made to quiesce the real-time input into the billing system for month end processing.

The automated reconciliation sub system can be configured or programmed to produce general and specialized balance reports. By way of exemplification and not limitation, such reports can include in and out of balance indications, feeder system and AppInstance IDs, audit scope IDs, date and time reconciliation started and ended, number of record processed, and number of errors detected.

For each error the automated reconciliation sub system can provide such data as the error message number; the date and time that reconciled was started and ended; the date and time that the error was detected. For a record that was not found in either the interim point logs or the target billing system log, the sub system can provide a copy of the record, the last log in which it was found, and a trace of the record (typically starting at the feeder system long and extending toward the target billing sub system); a copy of old unreconciled records; non-balancing fields (quantity, total records); and the logged date/time, audit scope ID, Request Ref, Target System ID and Quantity for unreconciled records.

FIG. 4 illustrates a simplified system 40 with a single feeder 41 to a single billing system 48. The feeder is associated to a feeder log 42, and to an interim node 43 with an associated interim log 44. The feeder side of the system is separated from the billing side by a fire wall 45. The billing side includes an interim node 46 with an interim node log 47, and the billing system 48 with an associated billing log 49.

FIG. 5 illustrates a complex system 50 with multiple feeders 41a-c to a single billing system 48. The feeders are associated to feeder logs 42a-c, and to an interim node 43 with an associated interim log 44. The feeder side of the system is separated from the billing side by a fire wall 45. The billing side includes an interim node 46 with an interim node log 47, and the billing system 48 with an associated billing log 49.

FIG. 6 illustrates a still more complex system 60 with multiple feeders 41a-c to multiple billing systems 48a-c. The feeders are associated to feeder logs 42a-c, and to multiple interim nodes 43a-b with multiple associated interim logs 44a-b. The feeder side of the system is separated from the billing side by multiple fire walls. The billing side includes multiple interim nodes 46a-b with multiple interim node logs 47a-b, and the billing systems 48a-c with associated billing logs 49a-c.

FIG. 7 illustrates a data collection—data reconciliation—billing system 60 applied to an electric power distribution system. The data collection—data reconciliation—billing system 60 has multiple feeders 41a-c, typically "electric meters" to multiple billing systems 48a-c. The feeders 41a-c collect data from the various associated "electric meters" and are associated to feeder logs 42a-c, and to an interim node 43 with an associated interim log 44. The feeder side of the system is separated from the billing side by a fire wall 45. The billing side includes an interim node 46 with an interim node log 47, and the billing systems 48a-c with associated billing logs 49a-c. In a purely deregulated environment the different billing systems could be different generating companies, such as a coal fired company, a gas fired company, a hydroelectric company, and a wind turbine company. Alternatively, the different billing systems could represent different markets or regulatory regimes.

The invention may be implemented, for example, by having the reconciliation embodied in software or under the control of software in a processor or server and executing a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for migrating data from one storage medium to another storage medium by reading data from a source volume on a source data storage device, as a bit image of a logical volume; and writing the data to a target volume on a target data storage device as a bit image of a logical volume.

This signal-bearing medium may comprise, for example, memory in the servers. The memory in the server may be non-volatile storage, a data disc, or even memory on a vendor server for downloading to one of the servers for installation. Alternatively, the instructions may be embodied in a signal-bearing medium such as the optical data storage disc The optical disc can be any type of signal bearing disc or disk, for example, a CD-ROM, CD-R, CD-RW, WORM, DVD-R, DVD+R, DVD-RW, or DVD+RW. Additionally, whether contained in a cluster with the server or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While the invention has been described with respect to certain preferred embodiments and exemplifications, it is not intended to limit the scope of the invention thereby, but solely by the claims appended hereto.

I claim:

1. A computer-implemented method of reconciling records of resource consumption at a plurality of resource consumption sites, the computer-implemented method comprising:
programming a specific processor with computer-executable instructions that, when executed, perform the steps of:
a. collecting and recording resource consumption at multiple resource consumption sites, wherein the resource consumption is a consumption of electricity that is transmitted through resource consumption feeders that serve multiple types of electricity generation companies, and wherein the electricity generation companies supply electricity to the resource consumption sites;
b. retrieving records from the resource consumption sites and interim control points on the resource consumption feeders, wherein the resource consumption feeders are electric power lines coming from the multiple electricity generation companies;
c. comparing a total number of resource consumption records forwarded from the resource consumption feeders with a total number of resource consumption records aggregated at the resource consumption sites;
d. issuing a notification, if an error is discovered during the comparing step;
e. if no errors are detected during the comparing step, continuing comparing records until all records are reconciled;
f. aggregating the records of resource consumption into aggregate business records of the resource consumption at the resource consumption sites; and
g. automatically reconciling resource consumption records at feeder sub systems, nodes, interim nodes and billing subsystems that are located between the resource consumption feeders and the resource consumption sites.

2. The computer-implemented method of claim 1, wherein the records from the resource consumption sites and the interim control points comprise an audit scope identifier, wherein the audit scope identifier describes a time and date of a next scheduled reconciliation of the resource consumption records at the resource consumption feeders and the resource consumption sites.

3. The computer-implemented method of claim 1, wherein the electricity generating companies each use a different billing structure, and wherein the computer-implemented method further comprises:
providing a reconciliation of records between the resource consumption sites and the interim control points to a specific billing structure that is used by a particular electricity generating company.

4. The computer-implemented method of claim 1, wherein the records from the resource consumption sites and the interim control points comprise a unique key, wherein the unique key is composed of a SystemID, an AppInstanceID, and a RefRequest, wherein the SystemID identifies a transmission system of a particular electricity provider, wherein the AppInstanceID identifies a particular feeder line used by that particular electricity provider, and wherein the AppInstanceID identifies a set of resource records used on that particular feeder line for that particular electricity provider during a specifically defined period of time.

5. The computer-implemented method of claim 1, further comprising reconciling resource consumption records in a reconciliation session by:
a. logging a reconciliation session start time of a reconciliation session,
b. retrieving a last reconciliation session start time,
c. issuing a notification of a logging session status,
d. ending the reconciliation session if an error is discovered, and
e. if no errors are detected, continuing comparing records until all records are reconciled, issuing a report, and logging session status.

6. The computer-implemented method of claim 1, wherein the multiple types of electricity generation companies that are selected from a group that includes a coal fired company, a gas fired company, a hydroelectric company, and a wind turbine company.

7. The computer-implemented method of claim 2, wherein the aggregate business records are chosen from a group consisting of transfer records, invoices, and units of resource consumption.

8. A processor system configured and controlled for reconciling resource consumption records, said processor system being between a plurality of resource consumption sites and a resource consumption record aggregation target site, said processor system designed for incorporating resource consumption at the resource consumption record aggregation target site into aggregate business records, said processor system comprising:
a. a collecting and recording subsystem for collecting and recording resource consumption at resource consumption sites, wherein the resource consumption is a consumption of gaseous hydrocarbons being transferred internally within an integrated petroleum refinery;
b. an automated reconciliation subsystem for reconciling records of resource consumption between the resource consumption sites and the resource consumption record aggregation target site by:
i. retrieving records from a resource consumption feeder and interim control points;
ii. comparing a total number of resource consumption records forwarded from the resource consumption feeders with a total number of resource consumption records aggregated at the resource consumption record aggregation target site;
iii. issuing a notification if an error is discovered; and
iv. if no errors are detected, continuing comparing records until all records of resource consumption between the resource consumption sites and the resource consumption record aggregation target site are reconciled;
c. a first interim system coupled to the resource consumption feeders;
d. a second interim system coupled to a set of billing systems used by multiple providers of the gaseous hydrocarbons being transferred within the integrated petroleum refinery; and
e. a firewall between the first interim system and the second interim system, wherein the firewall controls access between the resource consumption feeders and the set of billing systems used by the multiple providers.

9. The processor system of claim 8, wherein a reconciliation process comprises aggregating reconciled records of resource consumption into aggregate business records of the resource consumption at the resource consumption record aggregation target site.

10. The processor system of claim 8, wherein a reconciliation process comprises aggregating the records of resource consumption into aggregate business records of the resource consumption at the resource consumption record aggregation target site, and thereafter reconciling the aggregate business records at the resource consumption record aggregation target site.

11. The processor system of claim 8 wherein a reconciliation process comprises reconciling the records in a reconciliation session by:
 a. logging a reconciliation session start time of a reconciliation session,
 b. retrieving a last reconciliation session start time,
 c. issuing a notification of a logging session status,
 d. ending the reconciliation session if an error is discovered, and
 e. if no errors are detected, continuing comparing records until all records are reconciled, issuing a report, and logging session status.

12. The processor system of claim 8, wherein the aggregate business records are chosen from the group consisting of transfer records, invoices, and units of resource consumption.

13. A storage medium tangibly embodying a program of machine-readable instructions, wherein when the machine-readable instructions are executed by a digital processing system, cause the digital processing system to reconcile records of resource consumption at a plurality of resource consumption sites for incorporation into aggregate business records of the resource consumption at a target site, by a method comprising the steps of:
 a. collecting and recording resource consumption at resource consumption sites, wherein the resource consumption is heavy hydrocarbon that is transferred internally within units of an integrated petroleum refinery;
 b. retrieving records from a resource consumption feeder and interim control points;
 c. comparing a total number of resource consumption records forwarded from resource consumption feeders with a total number of resource consumption records aggregated at a target site;
 d. issuing a notification, if an error is discovered;
 e. if no errors are detected, continuing comparing records until all records from the resource consumption feeder and interim control points are reconciled;
 f. aggregating records of resource consumption of the heavy hydrocarbon into aggregate business records of the resource consumption of the heavy hydrocarbon at the target site; and
 g. automatically reconciling resource consumption records for the heavy hydrocarbon at feeder sub systems, nodes, interim nodes and billing subsystems that are located between the resource consumption feeders and resource consumption sites.

14. The storage medium of claim 13, wherein the aggregate business records of the resource consumption at the target site comprise billing records.

15. The storage medium of claim 13, wherein the method comprises aggregating reconciled records of resource consumption into aggregate business records of the resource consumption at the target site.

16. The storage medium of claim 13, wherein the method comprises aggregating the records of resource consumption into aggregate business records of the resource consumption at the target site and thereafter reconciling the aggregated records at the target site.

17. The storage medium of claim 13, wherein the method comprises reconciling records of heavy hydrocarbon consumption in a reconciliation session by:
 a. logging a reconciliation session start time of a reconciliation session,
 b. retrieving a last reconciliation session start time,
 c. issuing a notification of a logging session status,
 d. ending the reconciliation session if an error is discovered, and
 e. if no errors are detected, continuing comparing records until all records are reconciled, issuing a report, and logging session status.

18. The storage medium of claim 13, wherein the aggregate business records are chosen from a group consisting of transfer records, invoices, and units of resource consumption.

* * * * *

UNITED STATES PATENT AND TRADEMARK OFFICE
CERTIFICATE OF CORRECTION

PATENT NO. : 7,603,314 B2  Page 1 of 1
APPLICATION NO. : 10/809662
DATED : October 13, 2009
INVENTOR(S) : Mary Ellen Siksa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Fifth Day of October, 2010

David J. Kappos
*Director of the United States Patent and Trademark Office*